(12) United States Patent
French et al.

(10) Patent No.: US 8,855,256 B1
(45) Date of Patent: Oct. 7, 2014

(54) SERIAL DATA RECOVERY IN DIGITAL RECEIVER CONFIGURATIONS

(71) Applicant: Receivers Unlimited LLC, Palm, PA (US)

(72) Inventors: John Sargent French, Palm, PA (US); Ernest Eisenhardt Bergmann, Borough of Fountain Hill, PA (US)

(73) Assignee: Receivers Unlimited LLC, Palm, PA (US)

( * ) Notice: Subject to any disclaimer, the term of this patent is extended or adjusted under 35 U.S.C. 154(b) by 0 days.

(21) Appl. No.: 13/763,949

(22) Filed: Feb. 11, 2013

Related U.S. Application Data

(60) Provisional application No. 61/597,701, filed on Feb. 10, 2012, provisional application No. 61/658,539, filed on Jun. 12, 2012.

(51) Int. Cl.
*H04L 7/02* (2006.01)
*H04B 1/10* (2006.01)

(52) U.S. Cl.
CPC .................................... *H04B 1/10* (2013.01)
USPC ............ 375/360; 375/316; 375/326; 375/340

(58) Field of Classification Search
CPC ........................................................ H04B 1/10
USPC .................................. 375/316, 326, 340, 360
See application file for complete search history.

(56) References Cited

U.S. PATENT DOCUMENTS

| 5,602,510 | A | | 2/1997 | Bayruns et al. |
| 5,933,455 | A | * | 8/1999 | Hendrickson et al. ........ 375/261 |
| 5,999,578 | A | | 12/1999 | Ha |
| 7,447,490 | B2 | | 11/2008 | Kuo et al. |
| 7,496,133 | B2 | * | 2/2009 | Fujimori et al. .............. 375/219 |
| 2005/0227627 | A1 | | 10/2005 | Cyr et al. |

* cited by examiner

*Primary Examiner* — Leon Flores
(74) *Attorney, Agent, or Firm* — Wendy W. Koba (57) ABSTRACT

An adaptive filtering arrangement for providing bit-synchronous, time-dependent filtering of a time-varying analog input signal taking the form of a time-dependent low pass filter including at least one adaptive resistive element that exhibits a varying resistance value as a function of a time. The time-dependent low pass filter uses as a "control" input a modifying element responsive to a clock signal associated with the received signal for creating a time-varying control signal applied as an input to the adaptive resistive element. The time-varying control signal is created to be synchronous with a baud interval of a created output signal such that the instantaneous bandwidth of the time-dependent low pass filter is synchronous with the baud interval, exhibiting a relatively small bandwidth during a central portion of the baud interval and exhibiting a relatively large bandwidth during a transition from one baud interval to the next.

20 Claims, 9 Drawing Sheets

SERIAL DATA RECOVERY IN DIGITAL RECEIVER CONFIGURATIONS

CROSS-REFERENCE TO RELATED APPLICATIONS

This application claims the benefit of U.S. Provisional Application No. 61/597,701, filed Feb. 10, 2012 and U.S. Provisional Application No. 61/658,539, filed Jun. 12, 2012, both of which are herein incorporated by reference.

TECHNICAL FIELD

The present invention relates to the recovery of data in digital receiver systems and, more particularly, to the inclusion of bit-synchronous, time-dependent filtering to improve (lower) the bit error rate (BER) of the recovered data.

BACKGROUND OF THE INVENTION

Digital receivers are a necessary part of many communication systems. They are characterized by several parameters, one being their sensitivity. Sensitivity is a measure of how weak an incoming signal can be and still be detected with an error rate less than a predetermined value. Errors are caused by "noise" that is introduced in the transmission process and/or introduced in the receiver itself where amplifier noise or pickup is the case. Additionally, in a multi-signal configuration, there may be noise-like artifacts due to interference in a given channel, as the result of the presence of other signals in adjacent channels. Over long distances, and possibly with many amplifiers, the signals may become distorted due to dispersion and due to nonlinearities. These distortions may also worsen the receiver's BER for a given signal strength.

Receiver sensitivity is important inasmuch as a higher sensitivity for a specific receiver may provide for greater maximum distances of operation. For example in optical fiber-based communication systems, a 2 dB improvement in receiver sensitivity may lead to an increase in usable fiber lengths of 5-10 km. In the case of long haul systems with optical amplifiers placed periodically along the length of the fiber, the spacing can be increased between amplifiers by a similar amount.

Traditionally, receiver sensitivity is improved by carefully constructing a linear filter that maximizes the SNR prior to detection. Specifically, for a baseband signal, where the signal occupies a frequency spectrum of DC to about half the baud rate, a low pass filter with shape similar to the signal will be used so that any noise whose spectral components lie above the cut-off frequency are largely removed.

However, the use of a conventional filter is found to limit the bit error rate (BER) that may be achieved, since there is a trade-off between the bandwidth of the filter and amount of noise that is acceptable for a given application.

SUMMARY OF THE INVENTION

The present invention addresses the needs remaining in the prior art, and relates to the recovery of data in digital receiver systems and, more particularly, to the inclusion of bit-synchronous, time-dependent filtering to improve (lower) the bit error rate (BER) of the recovered data.

An exemplary embodiment of the present invention can be defined as an adaptive filtering arrangement for providing bit-synchronous, time-dependent filtering of a time-varying analog input signal taking the form of a time-dependent low pass filter including at least one adaptive resistive element that exhibits a varying resistance value as a function of a time. The time-dependent low pass filter uses as a "control" input a modifying element responsive to a clock signal associated with the received signal for creating a time-varying control signal applied as an input to the adaptive resistive element. The time-varying control signal is created to be synchronous with a baud interval of a created output signal such that the instantaneous bandwidth of the time-dependent low pass filter is synchronous with the baud interval, exhibiting a relatively small bandwidth during a central portion of the baud interval and exhibiting a relatively large bandwidth during a transition from one baud interval to the next.

BRIEF DESCRIPTION OF THE DRAWINGS

Referring now to the drawings, where like numerals represent like elements in several views.

DETAILED DESCRIPTION

In communication systems, the conversion of a received analog information signal into a digital data stream exhibiting an acceptable (low) bit error rate (BER) is known to be problematic for a variety of reasons. At least one area of concern is the presence of noise and distortion on the incoming baseband analog information signal, which can easily cause the decision circuit in the receiver to incorrectly decide the symbol (e.g., logic 1 vs. logic 0) to associate with the received analog signal.

Figure 1:
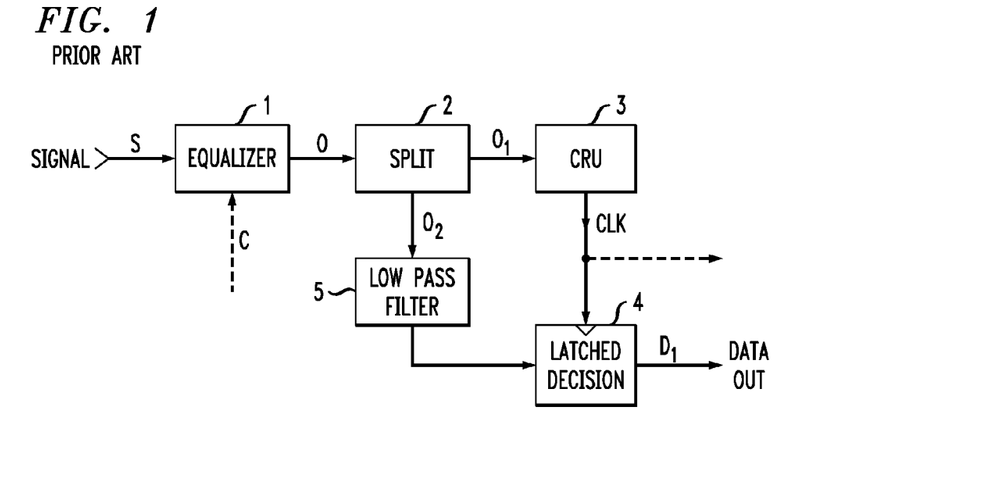
FIG. 1 is a block diagram of an exemplary prior art digital receiver.

The prior art is replete with techniques to improve the BER performance of digital receivers. FIG. 1 is a block diagram of one exemplary prior art arrangement. In this arrangement, an incoming baseband analog information signal S first passes through an equalizer 1, which is typically a filter that is used to compensate for at least a portion of the frequency-dependent attenuation that analog information signal S has experienced during its transmission from a signal source (not shown). Equalizer 1 is usually designed to minimize the amount of InterSymbol Interference (ISI) that is present in signal S. As is well-known in the art, ISI can be defined as the act of one data symbol "bleeding over" into an adjacent baud interval associated with another data symbol. This "bleeding over" (or smearing) is generally attributed the adverse effects of undesirable dispersion of the propagating signal during transmission. The presence of ISI results in increased uncertainty in the decision process in terms of deciding whether the incoming symbol represents a logic "0" or a logic "1". An additional control signal C may be applied as an input to equalizer 1, where the control signal C is used to adjust the filter characteristics to better handle the particular dispersion present in the incoming signal.

Continuing with the discussion of FIG. 1, the (filtered) analog output signal O from equalizer 1 subsequently passes through a splitter 2 to form a pair of separate analog output signals, designated $O_1$ and $O_2$ in FIG. 1. It is to be understood that signals $O_1$ and $O_2$ are essentially the same as the original output signal O, except for possibly a slight decrease in amplitude. Splitter 2 may comprise either a passive or active device, as desired. Signal $O_1$ is thereafter applied as an input to a clock recovery unit (CRU) 3 and used to ascertain (or reproduce) an acceptable clock signal CLK. This CLK signal is then presented as the "clock" input to a latched decision circuit 4. The remaining analog signal $O_2$ is applied as the data input to latched decision circuit 4, where the CLK is used to define the instances in time when circuit 4 makes a decision of the symbol value of the digital output signal D, based upon the value of analog signal $O_2$.

In this particular prior art arrangement of FIG. 1, analog information signal $O_2$ first passes through a low pass filter 5 before being applied as the data input signal to latched decision circuit 4. As briefly mentioned above, conventional receivers utilize a low pass filter to remove broadband noise components that are in frequency from the passband where the actual information signal resides. As shown in FIG. 1, therefore, low pass filter 5 is used to improve the signal-to-noise ratio (SNR) of analog signal $O_2$ prior to using it in making the "0" or "1" decision within latched decision circuit 4.

It should be understood that the various electrical signal inputs and outputs shown in FIG. 1 (as well as other drawings hereinafter) may be either single-ended or differential in form. For single-ended operation, these inputs are single terminal, with reference to ground (or another suitable supply voltage level). In the case of differential operation, input and output signals are represented by two or more terminals, representing the electrical signal and its inverse. The use of a third terminal, represent ground or a supply voltage reference value, may be present in some situations (such as when using return-to-zero signaling).

Figure 2:
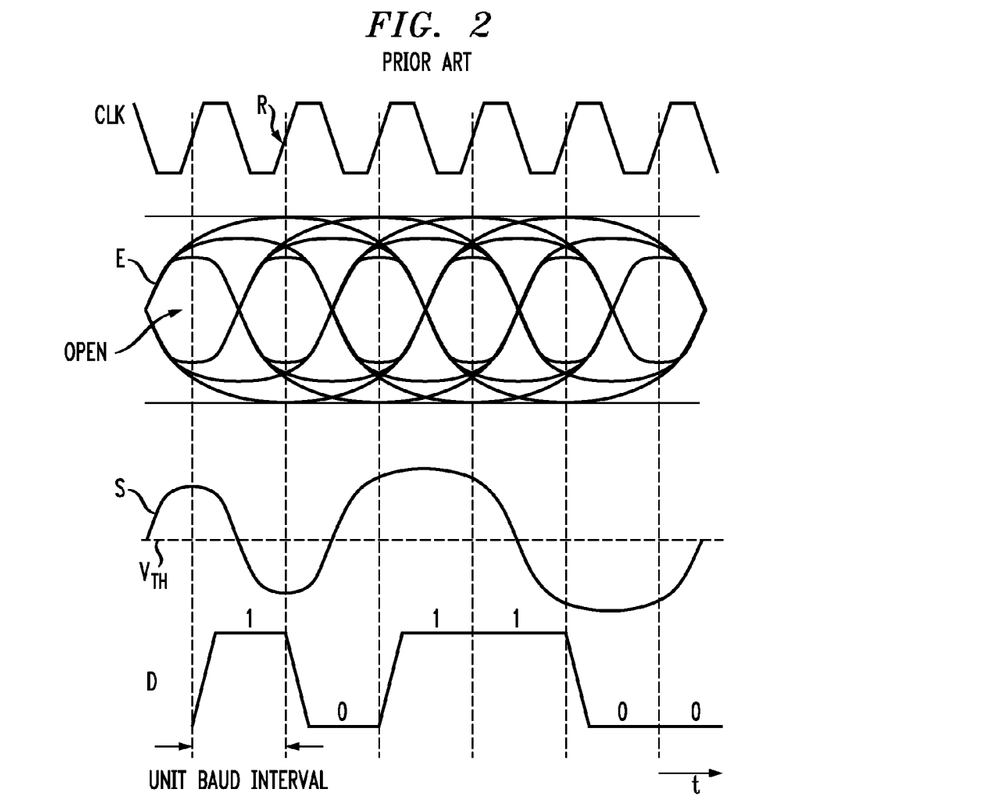
FIG. 2 is a timing diagram illustrating the various data and clock waveforms associated with the arrangement of FIG. 1.

FIG. 2 is a timing diagram illustrating the various data and clock waveforms associated with the arrangement of FIG. 1. The uppermost waveform in FIG. 2 is the CLK signal as generated by CRU 3 of FIG. 1. A rising edge R of the CLK signal is used to define a beginning of a time interval, where the dotted vertical lines in FIG. 2 illustrate the series of time intervals. The spacing between successive rising edges R is defined as the unit baud intervals of the serial data signal.

Also shown in FIG. 2 is an exemplary eye diagram E, which is a display of many overlaid traces of this signal. The display of many overlaid traces is based upon the triggering from the CLK signal. As known in the art, an eye diagram E will be "open" in the area associated with rising edge R.

The third graph in FIG. 2 is a portion of an exemplary input data signal S. With reference to latched decision circuit 4 of FIG. 1, circuit 4 operates by comparing the value of input data signal S with a threshold value (TH) that is set by circuit 4 and shown as a horizontal line along signal S. The comparison is configured to occur at the beginning of each baud interval (point R on the rising edge of the CLK signal) and defines the value of signal S at that point in time as being either a "1" or "0", based on whether signal S is above threshold TH (defining a logic "1") or below threshold TH (defining a logic "0"). In this example, and reading from left to right, this data stream is defined as being "101100".

The effects of the presence of small amounts of noise on input baseband analog information signal S are known to add fluctuations in amplitude to the propagating signal (either voltage or current). These additive fluctuations on the data signal S may result, at times, in erroneous choices of data values and thus produce a non-zero BER in the digital data output from latched decision circuit 4. For the common situation where a certain amount of noise is always present on input information signal S, different implementations of low pass filtering will result in different values of the BER.

Figure 3:
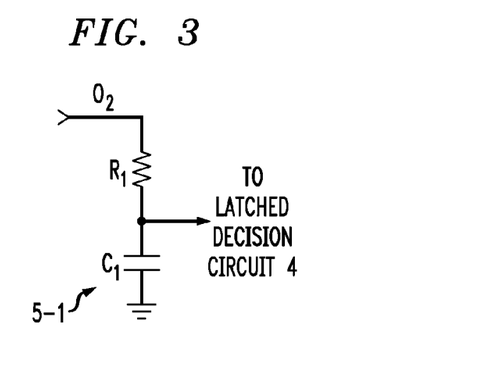
FIG. 3 illustrates an exemplary low pass filter configuration that may be used in the implementation of a low pass filter in the arrangement of FIG. 1.
Figure 4:
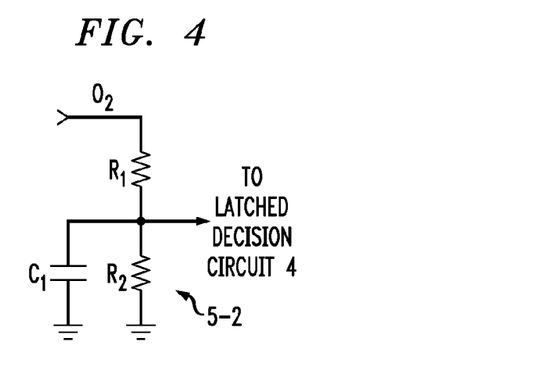
FIG. 4 illustrates another exemplary low pass filter configuration that may be used in the implementation of a low pass filter in the arrangement of FIG. 1.
Figure 5:
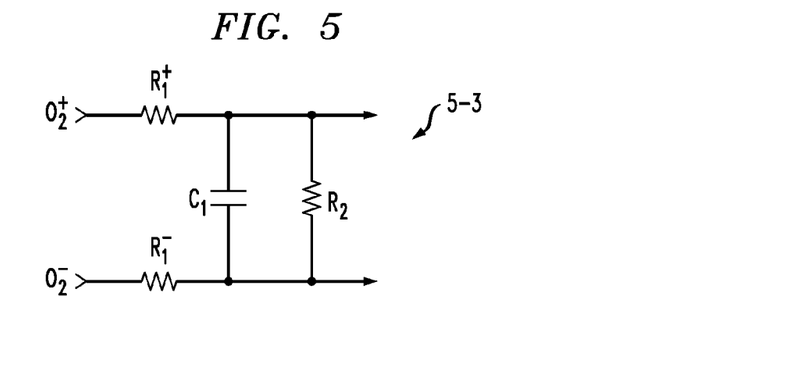
FIG. 5 illustrates yet another low pass filter arrangement that may be used in the receiver configuration of FIG. 1.

FIGS. 3, 4 and 5 illustrate various exemplary low pass filter configurations that may be used in the implementation of low pass filter 5.

In FIG. 3, an exemplary low pass filter 5-1 is shown as comprising a series arrangement of a resistor $R_1$ and capacitor $C_1$. Signal $O_2$ applied as an input to resistor $R_1$, with capacitor $C_1$ coupled to ground. The output signal is shown as taken from the junction of resistor $R_1$ and capacitor $C_1$, where this output signal is then applied as the data signal input to latched decision circuit 4 (see FIG. 1). The frequency characteristic of low pass filter 5-1 is governed by the RC time constant of this configuration, where the frequency response is generally constant for frequencies well below the value of $1/R_1C_1$, and then falls off at a rate of approximately 6 dB/octave for frequencies well above $1/R_1C_1$.

FIG. 4 illustrates a different configuration of a low pass filter, denoted as low pass filter 5-2. In this case, an additional resistor $R_2$ is added in parallel with capacitor $C_1$, and the RC time constant is modified by changing the resistance value to the total value associated with the parallel combination of $R_1$ and $R_2$, where $$R_{11}=(R_1*R_2)/(R_1+R_2).$$

FIG. 5 illustrates an exemplary low pass filter arrangement as used with a balanced, differential pair of input signals, denoted $O_2^+$ and $O_2^-$. In this case, low pass filter 5-3 includes a pair of matched input resistors, $R_1^+$ and $R_1^-$, followed by capacitor $C_1$ and shunting resistor $R_2$ (where $R_1 = R_1^+ + R_1^-$).

In each of these examples, it is assumed that the impedance "seen" at the input to the low pass filter (i.e., the driving impedance) is negligible. If this is not the case, the input impedance is added to the effective value of $R_1$ to determine the RC parameter. Similarly, it is assumed that the output "sees" an infinite load impedance. If the load is instead a finite resistance, it may be considered as a modification of the output shunt impedance used in calculating the RC parameter.

Figure 6:
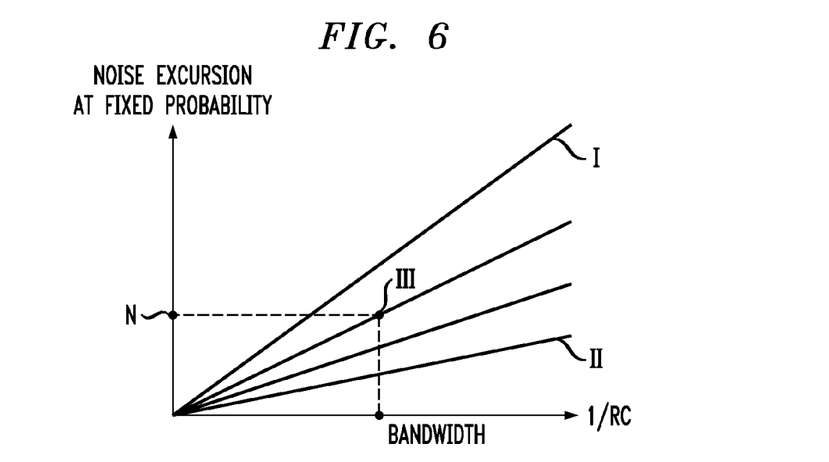
FIG. 6 is a graph of noise excursions as a function of 1/RC (i.e., the bandwidth of the low pass filter), for a variety of different noise conditions.

MG. 6 is a graph of noise excursions as a function of 1/RC (i.e., the bandwidth of the low pass filter), for a variety of different noise conditions. These noise conditions are generally random functions that follow a Gaussian distribution, and are therefore expected to be unbounded such that for any chosen degree of variation, there will be relatively few instances when the observed variation will exceed the chosen value. Curve I represents the presence of a large degree of noise or a very demanding low BER. Alternatively, curve II represents much less noise (or acceptance of a larger BER). Thus, a selection to configuration a filter for a given BER (say, associated with curve III), will be constrained to exhibit a bandwidth associated with an acceptable amount of noise excursion (say point N).

Figure 7:
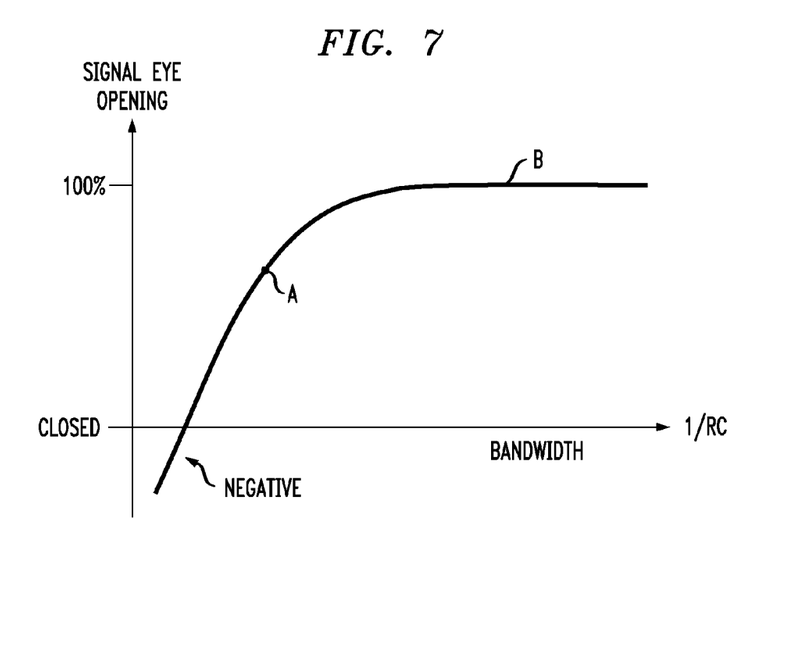
FIG. 7 plots a typical expectation of an eye opening (as associated with the eye diagram curve E of FIG. 2) as a function of 1/RC for an ideal filtered, baseband signal.

A related plot, as shown in FIG. 7, is a typical expectation of the eye opening (curve E in FIG. 2) as a function of 1/RC for an ideal filtered, baseband signal (that is, presuming a signal with no noise being present). The horizontal axis in the plot of FIG. 7 is an indication of the amount of bandwidth measured by 1/RC. The vertical axis is a measure of the eye opening, where "100%" represents an eye opening that matches the minimum and maximum electrical values of the signal (i.e., the "rails" of the signal). With this eye opening, the associated decision circuit will have a 100% confidence level in selecting the proper logic "1" or "0" value.

In moving away from this 100% level, if the opening becomes so small that it is not possible to differentiate the presence of a logic "0" from a logic "1", then the eye is defined as "closed" and the decision circuit has no confidence in that the selected symbol value is correct (resulting in an extremely large BER). A portion of the curve as shown in FIG. 7 is below "closed" (or negative), indicating that some of the logic "1" selections are definitely below some of logic "0" selections. The same curve is shown as being positive at points A and B, where the eye is open. In particular, point A is associated with the condition where the eye is approximately half open (similar to the configuration of signal E in FIG. 2) and point B is associated with a large value of 1/RC and the condition where the eye is fully open.

While this 100%, completely open eye condition is preferred, it comes at the cost of relatively small values of R and C (as required for a "large" value of 1/RC). When the RC value is small, this corresponds to a time interval that is very much less than the baud interval (that is, the time duration of each digital bit or symbol).

Figure 8:
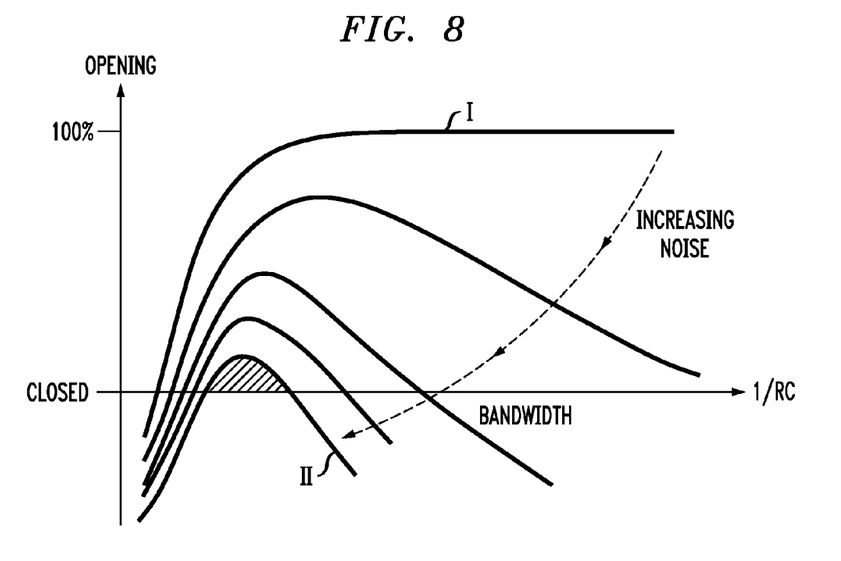
FIG. 8 contains a plurality of curves of eye opening, each curve associated with a different amount of noise included in the input information signal.

The set of curves in FIG. 8 expands the ideal situation as depicted in FIG. 7, where the set of curves as shown in FIG. 8 include varying levels of noise (combining the results of the plots of FIG. 6 with the ideal condition of FIG. 7). Curve I in FIG. 8 equates with the ideal condition as discussed above in association with FIG. 7. As the amount of noise present in signal $O_2$ increases, the plot of the eye opening is seen to drop off dramatically, limiting the range of RC values where the eye opening remains positive (a necessary condition for an acceptable BER value). Indeed, if the amount of noise becomes very large, as represented by plot II in FIG. 8, there is only a very limited range of 1/RC that is associated with a positive open eye (and, at that, the eye opening is well below even the 25% value).

From all of the above, it is clear that for the common situation where a certain amount of noise will inevitably be present with received baseband analog information signal S, any of these techniques that require the use of a low pass filter in the data signal recovery path will impact the ability to achieve a relatively low BER rate, by virtue of the 1/RC value required to eliminate an acceptable amount of noise.

It is the intention of the present invention to address this problem and instead provide a solution that more easily achieves a relatively low BER value than heretofore possible with the known prior art low pass filter configurations.

Figure 9:
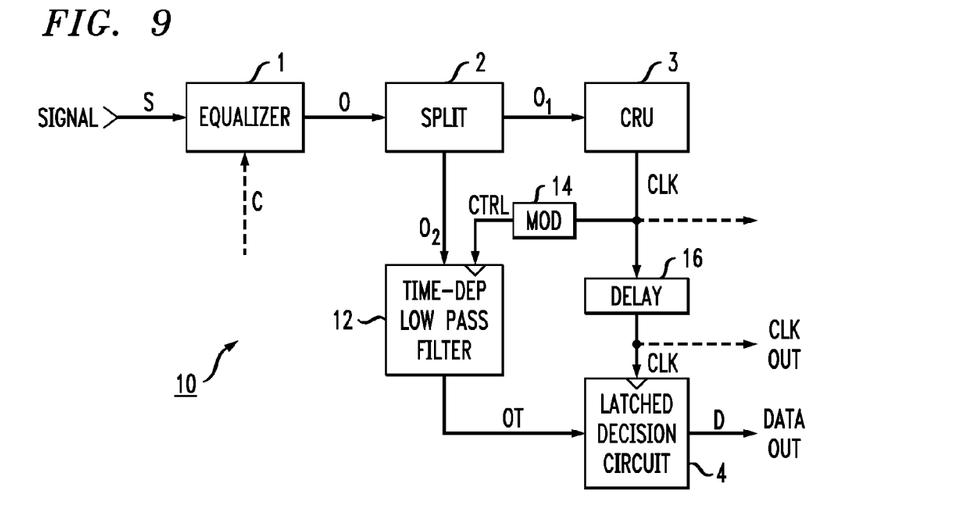
FIG. 9 illustrates an exemplary receiver circuit formed in accordance with the present invention that has been found to achieve significantly better BER performance than prior art arrangements, such as that depicted in FIG. 1.

FIG. 9 illustrates an exemplary receiver circuit 10 that has been found to achieve significantly better BER performance than the prior art, without unnecessarily limiting the bandwidth of the data input to the latched decision circuit. In particular, the present invention as described in detail below, utilizes bit-synchronous time-dependent low pass filtering to modify the bandwidth of the low pass filter as a function of time to control the amount of noise present during the unit baud interval of information signal S.

In referring to arrangement of FIG. 9, those elements that are similar to those described above in association with prior art FIG. 1 carry the same reference numeral and perform a similar function as described above. Thus, input baseband signal S similarly passes through an equalizer 1 and is divided by splitter 2 into a pair of essentially identical output signals $O_1$ and $O_2$, with signal $O_1$ applied as an input to CRU 3 to generate the CLK signal.

In accordance with the present invention, an improvement in BER is provided by using a time-dependent low pass filter 12 whose time dependence is bit-synchronous with the information signal being analyzed (that is, synchronous with the CLK signal generated by CRU 3). The timing input to time-dependent low pass filter 12, defined as CTRL, is shown as the output signal from a modifying element 14. As will be discussed below in association with FIG. 12, CTRL signal output from modifying element 14 is a "modified" version of the CLK signal generated by CRU 3. With further reference to FIG. 9, a delay element 16 is shown as included in the clock signal path between CRU 3 and latched decision circuit 4, since the additional processing required by time-dependent low pass filter 12 will necessarily incur a delay on the data signal path input to latched decision circuit 4. Depending on the situation, the value of delay element 16 may be fixed or adjustable, and positive or negative, as required.

As will be described in detail below, the intent of the arrangement of the present invention is to vary the bandwidth of filter 12 in a synchronous manner with the recovered clock signal so that a first, wide bandwidth filter (which accepts noise) is associated with a relatively short time span over the area of symbol transition from one bit to the next (which needs to quickly occur) and a second, narrow bandwidth filter (which eliminates most high frequency noise) is associated with a longer time span over the "center" of a transmitted signal. As a result, a majority of the noise in the transmitted signal will be removed during the longer interval where the value of the symbol is remaining constant, with only the noise present during the transition between adjacent symbols being allowed to propagate through the filtering arrangement. As a result, the signal applied as the data input to latched decision circuit 4 will be filtered in a time-varying fashion, with most of the noise being removed, allowing for the BER associated with the complete receiver arrangement to be significantly lower than prior art receivers that use a static low pass filter to remove noise.

Figure 10:
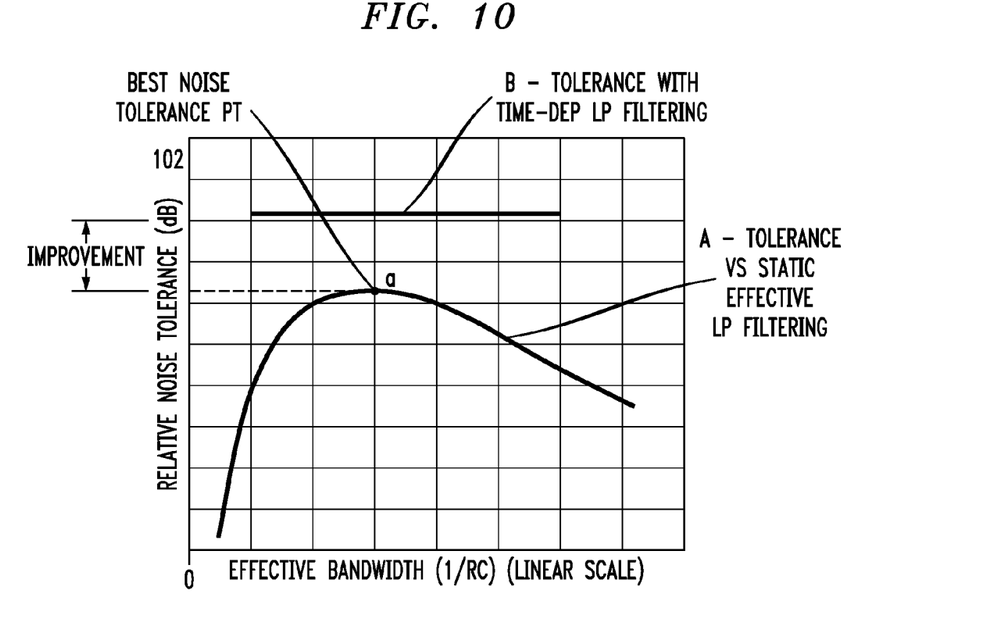
FIG. 10 is a plot showing relative noise tolerance as a function of effective bandwidth (i.e., 1/RC), comparing a conventional prior art arrangement (i.e., using a "static" low pass filter element) to a configuration in accordance with the present invention.

FIG. 10 is a plot showing relative noise tolerance as a function of effective bandwidth (i.e., 1/RC), comparing a conventional prior art arrangement (i.e., using a "static" low pass filter element 5) to a configuration in accordance with the present invention, where the characteristics of the low pass filter varying as a function of time, as embodied by time-dependent low pass filtering arrangement 12. The vertical axis plots in particular the relative noise tolerance associated with obtaining a chosen maximum acceptable BER for a given signal S, with variable amounts of noise added to that signal.

Curve A, associated with the prior art use of a "static" low pass filter, resembles the curves described above in association with FIG. 8. Generally speaking, if the eye opening is large with a given low pass filter, then more noise can be tolerated than if the eye is barely open. Referring to curve A, there is a point a that is associated with a maximum noise tolerance value—any greater amount of filtering (i.e., larger RC value) only results in more eye closure, since the received signal is now being distorted by the filtering. Less filtering (i.e., smaller RC value) results in more eye closure since a larger amount of noise will pass through.

Curve B is associated with the configuration of the present invention and is intended to show that the there is no specific effective bandwidth, since the value of RC varies as a function of time. The vertical positioning of curve B is intended to indicate its apparent relative noise tolerance, as well its overall improvement in BER values with respect to the prior art.

Figure 11:
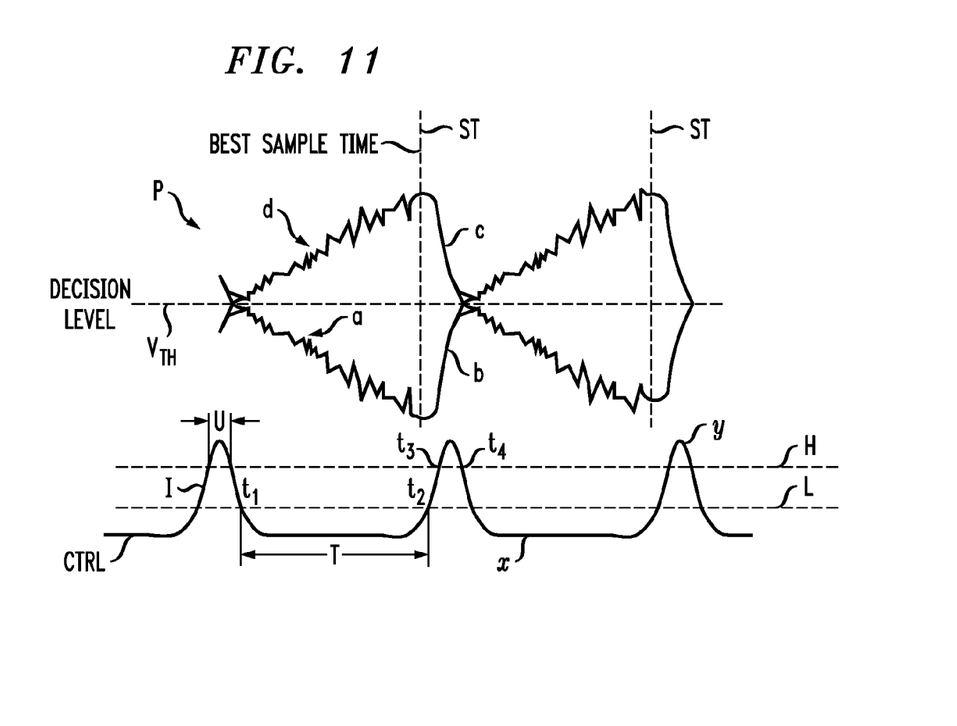
FIG. 11 illustrates the methodology associated with this improvement in performance as associated with the use of time-dependent low pass filtering in accordance with the present invention.

FIG. 11 illustrates the methodology associated with this improvement in performance as associated with the use of time-dependent low pass filtering in accordance with the present invention. At a high level conception, the desire is to vary the RC value of the filtering element at the (known) baud rate of incoming signal S. Thus, by controlling the RC value to modify the filtering characteristic to be time-varying at the baud rate, the combined values of the (wanted) signal and (unwanted) noise exiting time-dependent low pass filtering arrangement 12 would look qualitatively as shown in FIG. 11.

Curve I in FIG. 11 is an exemplary plot of the value of 1/RC as a function of time, generated as the CTRL signal output by modifying element 14 of circuit 10. A first boundary line L is shown in association with curve I as defining the "upper limit" of segments x of curve I. Segments x correspond to the time periods where the value of RC is much longer than the duration of the associated symbol (referred to above as the "unit baud interval"). A second boundary line H is shown in association with CTRL as defining the "lower limit" of segments y of curve I. The set of segments y are associated with those time periods where the RC time constant is shorter than the unit baud interval.

With these definitions in place, and with continued reference to FIG. 11, it is shown that each segment x has a duration T (e.g., from time $t_1$ to time $t_2$) and each segment y has a duration U (e.g., from time $t_3$ to time $t_4$). The combined values of durations T and U is slightly less than the unit baud interval. It is intended that each segment y be centered during the symbol transition and each segment x be centered with the midpoint of the unit baud interval. By accumulating the signal over time period T, it is possible to minimize the fluctuations associated with contaminating noise by using a very large RC value in the filtering process (large in comparison to the unit baud interval). In accordance with the present invention, the CTRL signal output from modifying element 14 is configured to cause time-dependent filter 12 to exhibit this large RC value for the narrowband time period T.

During the transition from one unit baud interval to the next, it is possible that there may be a sudden change in electrical signal levels. Thus, in order for the RC circuitry to change quickly in response to this change in symbol value, it is desired for the RC time constant to be much smaller than the unit baud interval and, in fact, to be even shorter than the length U of segment y. Modifying element 14 provides this change by changing the time-varying CTRL signal that is applied as an input to filter 12.

These needs are shown particularly in the eye-like patterns P shown in the additional diagram of FIG. 11. These patterns represent the time-varying electrical levels as appearing at the output of time-dependent low pass filter 12. As seen, the eye is shaped somewhat like a symmetrical quadrilateral defined by sides a, b, c and d.

During the accumulation portion, of duration T, when the RC time constant is of a relatively large value, the signal is shown as being accumulated along path a for a logic "0" and along path d for a logic "1". The effects of additive noise is shown as the local fluctuations along these paths a and d. For simple non-return to zero (NRZ) type input signals, the input signal levels are expected to be fairly constant so that the accumulated signals will appear to be essentially linear, and either falling for a logic "0" or rising for a logic "1". The noise, on the other hand, will cause the local variations as shown.

Due to the random character of this noise, the accumulation will be such that the root-mean-square (RMS) value will be growing as the square root of the time interval, beginning with the start of each accumulation interval. This square-root dependence can be seen as the linear accumulation of the noise energy, which is proportional to the square of the RMS value. Although the effects of accumulating the noise during the period of time associated with the large RC value is to also have the noise increase, accumulating the signal results in the signal growing faster. As a result, the effective SNR, when sampling toward the end of each lower interval x is best determined during the sample times as indicated by vertical dotted lines ST in FIG. 11.

During the remainder of each baud interval (i.e., the portion associated with segment y), the value of RC is made very small, resulting in a large value of 1/RC and the "instantaneous bandwidth" of time-dependent low pass filtering arrangement 12 being significantly increased. Indeed, filter 12 responds rapidly to the changing conditions and "decays" quickly toward a fixed level that is intended to coincide with the threshold level TH of latched decision circuit 4. Paths b and c are illustrative of these quick movement regions for a logic "0" and logic "1", respectively.

In accordance with the present invention, the actual values of boundary lines L and H are determined by modifier element 14, as shown in FIG. 9. In particular, FIG. 12 contains the plots of a variety of waveforms that are synchronous with the bit rate and could be applied as the CTRL input to time-dependent low pass filtering arrangement 12. Such waveforms affect the instantaneous RC value in either a linear or nonlinear form, depending on the particular waveform that is utilized.

As discussed above in association with FIG. 11, the important situations are where the RC values are high enough such that the data and noise signals are both being accumulated over a longer time period, and the RC values are low the decision point quickly returns to the threshold value TH. With reference to FIG. 9, the exemplary waveforms that are synchronous with the bit rate are created by modifying module 14, based on the CLK output from CRU 3. In accordance with the present invention, modifying module 14 may be either a passive or active module, and may be linear or nonlinear in its behavior. Various types of functionality that may be associated with modifying module 14 include, but are not limited to, the following: delay, offset, amplification, attenuation, filtering and inversion.

Figure 12:
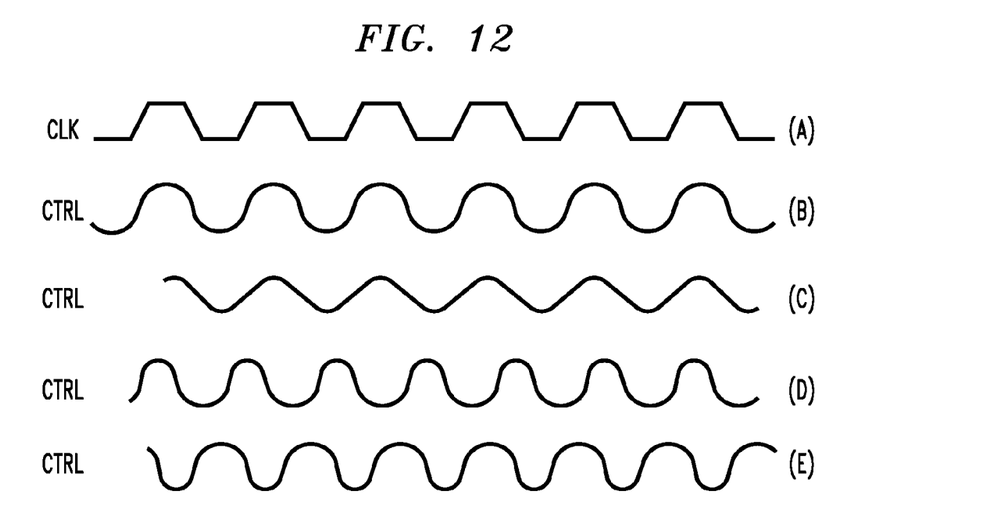
FIG. 12 contains the plots of a variety of waveforms that are synchronous with the bit rate and could be applied as the CTRL input to time-dependent low pass filtering arrangement.

Curve A of FIG. 12 is defined as the CLK signal output from CRU 3. If such a signal is slightly low-pass filtered, the resultant waveform is somewhat "rounded", as shown in curve B. Therefore, in one embodiment, modifying element 14 may comprise a simple low pass filter that creates a CTRL output in the form of curve B. Alternatively, if modifying module 14 comprises a resonant circuit that is tuned to about the clock rate, the output CTRL signal takes the form shown in curve C of FIG. 12. By including some type of nonlinearity in modifying module 14, the output CTRL signal will take the form as shown in curve D. Including an inverter with this arrangement then yields a CTRL signal output as shown in curve E. Therefore, in accordance with the present invention, it is to be understood that the functionality of modifying module 14 is important in order to achieve the specific behaviors as described above in association with FIG. 11.

Figure 13:
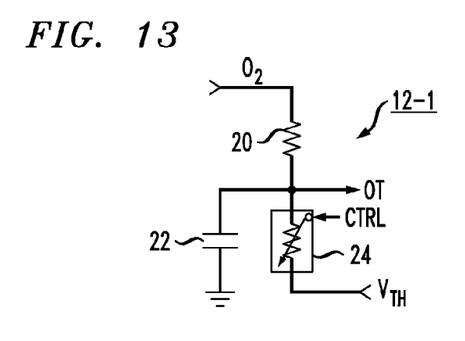
FIG. 13 illustrates an exemplary time-dependent low pass filter that is suitable for use in a single-ended digital receiver arrangement formed in accordance with the present invention.
Figure 14:
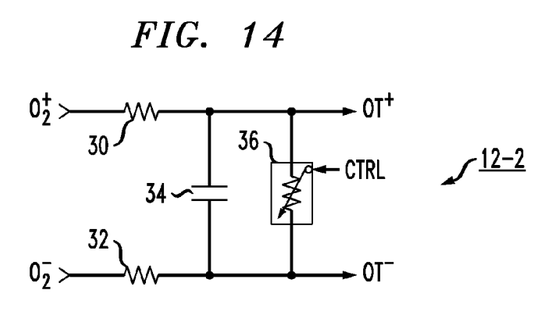
FIG. 14 illustrates an alternative time-dependent low pass filtering arrangement, in this case configured to accept a differential input signal.

FIGS. 13 and 14 illustrate two specific embodiments of time-dependent low pass filtering arrangement 12 that may be utilized in the circuitry of the present invention as shown in FIG. 9. In particular, FIG. 13 illustrates an exemplary time-dependent low pass filter 12-1 that is suitable for use in a single-ended embodiment (as opposed to a differential arrangement). Referring to FIG. 13, "noisy" data signal $O_2$ (which is an output from splitter 2, as shown in FIG. 9) is applied as an input to a first resistor 20. A capacitor 22 is included between first resistor 20 and ground (where this capacitance may embody merely stray capacitance).

In accordance with the present invention, filter 12-1 further comprises a time-dependent resistance element 24, where the value of element 24 can be rapidly changed as a function of time, using an input control signal CRTL from modifying element 14. Time-dependent resistance element 24 is shown as coupled between first resistor 20 and a reference voltage terminal which is held at the threshold voltage $V_{TH}$ used by latched decision circuit 4.

As shown, this arrangement will produce a time-dependent filtered signal OT that varies over the unit baud interval, since a bit-synchronous control signal (CTRL) is used to modify the bandwidth of filter 12 over the baud interval, with the desired greater RC value at the transition between intervals and the lower RC value in the mid-interval range.

FIG. 14 illustrates an alternative time-dependent low pass filtering arrangement 12-2, in this case configured to accept a differential input signal (shown as $O_2^+$ and $O_2^-$). First differential input signal $O_2^+$ passes through a first resistor 30 and second differential input signal $O_2^-$ passes through a second resistor 32 (that is essentially matched in value to first resistor 30). A capacitor 34 and a time-dependent resistance element 26 are shown as disposed in parallel between the rails supporting the pair of incoming differential input signals. As with the embodiment described above in association with FIG. 13, time-dependent resistance element exhibits a resistance value that varies as a function of the input CTRL signal (the output from modifying element 14, see FIG. 9). In order that the differential output (represented as $OT^+$ and $OT^-$) will rapidly approach a logic 0 when the time-dependent RC value is decreased.

Figure 15:
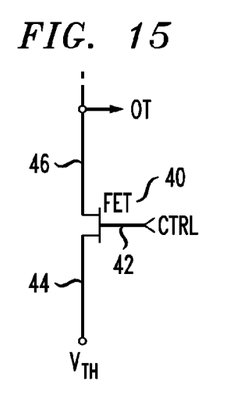
FIG. 15 illustrates a relatively simple configuration of a time-dependent resistance element, in this case taking the form of a field-effect transistor (FET), for use in the time-dependent low pass filter of the present invention.
Figure 16:
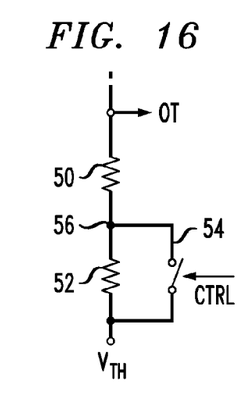
FIG. 16 illustrates an alternative configuration of a time-dependent resistance element for use in the time-dependent low pass filter of the present invention.
Figure 17:
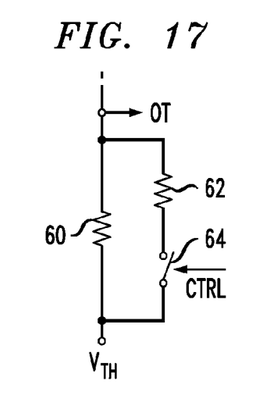
FIG. 17 illustrates yet another arrangement of a time-dependent resistance element that may be used in the time-dependent low pass filter of the present invention.

FIGS. 15, 16 and 17 illustrate various arrangements that may be utilized to form a time-dependent resistance element useful in the arrangements in FIGS. 13 and 14. It is to be understood that these illustrated arrangements are exemplary only, and there are many other specific circuit arrangements that can be utilized to provide the desired time-dependent change in the RC value in accordance with the present invention.

FIG. 15 illustrates a relatively simple configuration of a time-dependent resistance element, in this case taking the form of a field-effect transistor (FET) 40, with the gate terminal 42 of FET 40 responsive to CTRL signal input from modifying element 14. As is well known in the art, depending on the voltage difference between source terminal 44 and gate terminal 42 of FET 40, the effective resistance of the FET can be varied between a few ohms ("saturation" mode) and essentially infinite ohms ("cutoff" mode). Therefore, in accordance with the present invention, it is possible to use FET 40 as a variable resistance, with the variable gate input (i.e., the time-varying CTRL signal applied at gate terminal 42) creating the desired change between the source and gate terminals.

FIG. 16 illustrates an alternative embodiment of a time-dependent resistance element, shown as comprising a pair of resistors connected in series between the output terminal OT and the threshold voltage level $V_{TH}$, these elements shown as resistor 50 and resistor 52. A switch element 54 is shown as positioned in parallel with resistor 52, extending between node 56 and threshold voltage level $V_{TH}$. A "fast" transistor is typically utilized as a switch element. By virtue of using the CTRL signal output from modifying element 14 to control the action of switch element 54, the resistance "seen" between output terminal OT and threshold voltage terminal $V_{TH}$ will change as resistor 52 is either included or bypassed.

The arrangement as shown in FIG. 17 is a slight variation of the embodiment shown in FIG. 16, wherein this case a first resistor 60 is disposed between output terminal OT and reference voltage terminal $V_{TH}$. A series combination of a second resistor 62 and switch element 64 is shown as disposed in parallel with first resistor 60 between these same two terminals. IN this arrangement, the application of the CTRL signal to control the opening and closing of switch element 64 will function to change the resistance "seen" between the two terminals as either resistor 60 (when switch element 64 is "open"), or the parallel combination of resistor 60 and resistor 62 (which switch element 64 is closed). Inasmuch as the CTRL signal varies as a function of the baud interval, the output signal OT will see a resistance that also varies as a function of the baud interval, and thus have a modified RC value that allows for a better eye opening to be formed.

Figure 18:
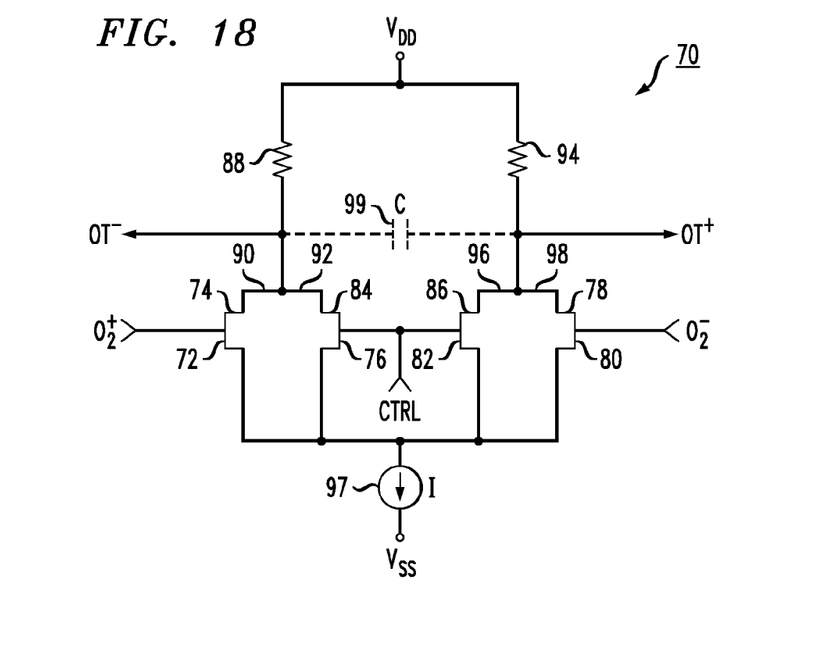
FIG. 18 illustrates an exemplary arrangement based on the use of FETs in the form of an active time-dependent filter 70 that can be formed to provide gain as well as filtering.
Figure 19:
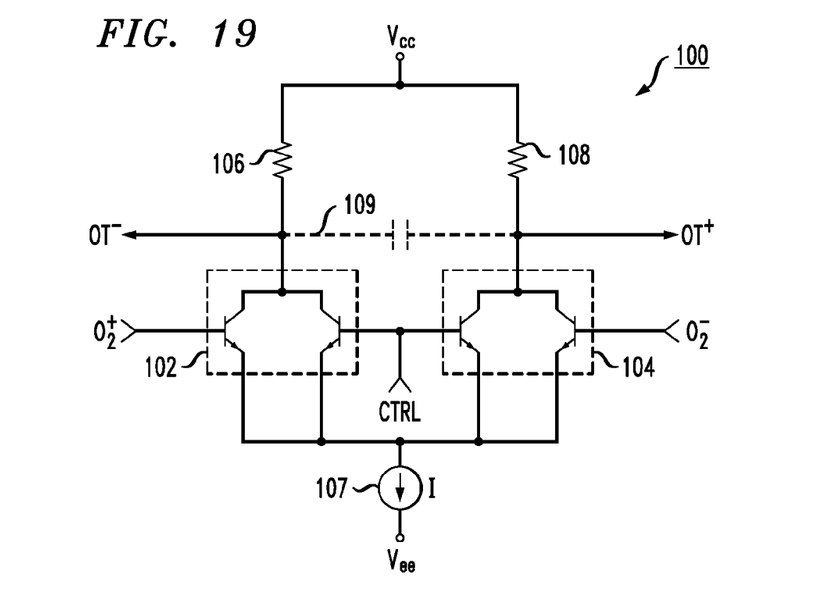
FIG. 19 illustrates an alternative embodiment of a differential time-dependent active filtering arrangement, similar to the embodiment of FIG. 18 but in this case formed of bipolar transistors.

FIGS. 18 and 19 illustrate exemplary configurations of a time-dependent low pass filtering arrangements that may be used in conjunction with a differential input signal. FIG. 18 illustrates an exemplary arrangement based on the use of FETs in the form of an active time-dependent filter 70 that can be formed to provide gain as well as filtering. As is well known in the art, a differential gain circuit is formed by applying a pair of input differential signals to the gate terminals of a pair of FETs. The input signals are inverted and then amplified by varying the current passed through the pair of FETs.

Looking at the specifics of FIG. 18, first input signal $O_2^+$ is applied as an input to a gate terminal 72 of a first FET 74 of a first pair of parallel FETs 74 and 76. Second input signal $O_2^-$ is applied as an input to a gate terminal 78 of a second FET 80 of a second pair of parallel FETs 80 and 82. As shown, the CTRL signal output from modifying element 14 (see FIG. 9) is applied as a common input to gate terminal 84 of FET 76 and gate terminal 86 of FET 82. A first resistor 88 is coupled between a voltage source (e.g., $V_{DD}$) and the interconnection of drain terminals 90, 92 of the first pair of FETs 74,76. A second resistor 94 is similarly coupled between $V_{DD}$ and drain terminals 96, 98 of second FET transistor pair 80, 82. A stray capacitance C (known in the art as "Miller capacitance") may exist between the two source terminal connections, as shown in FIG. 18, as a result of the CMOS fabrication techniques used to implement this arrangement. Alternatively, a separate capacitive device 99 may be used to create the desired RC response. A current source 97 is included in this arrangement and connected between voltage supply $V_{ss}$ and the source terminals of FETs 74, 76, 80 and 82.

In accordance with the present invention, depending upon the varying value of the CTRL signal applied to gate terminals 84 and 86, the effective resistance associated with FETs 76 and 82 will vary, thus varying the effective RC value of the low pass filtering arrangement. As a result, the pair of differential output signals $OT^+$ and $OT^-$ can be controlled to vary such that the effective RC value provides the optimum eye opening and associated low BER.

FIG. 19 illustrates an alternative embodiment of a differential time-dependent active filtering arrangement 100, similar to the embodiment of FIG. 18 but in this case formed of bipolar transistors. As shown, arrangement 100 includes a first bipolar transistor pair 102, using collector inputs of $O_2^+$ and CTRL. A second bipolar transistor pair 104 uses inputs $O_2^-$ and CTRL. A pair of resistors 106 and 108 is disposed between $V_{cc}$ and the combined collectors of first pair 102 and second pair 104, respectively. A bridging capacitor 109 (which may include stray capacitance) is present between resistors 106 and 108. As shown in FIG. 19, the differential output signals $OT^+$ and $OT^-$ are taken from the junction between the resistors and the bipolar transistor pairs. The emitter terminals from first and second bipolar transistor pairs are coupled through a current source 107 to the $V_{cc}$ terminal.

Figure 20:
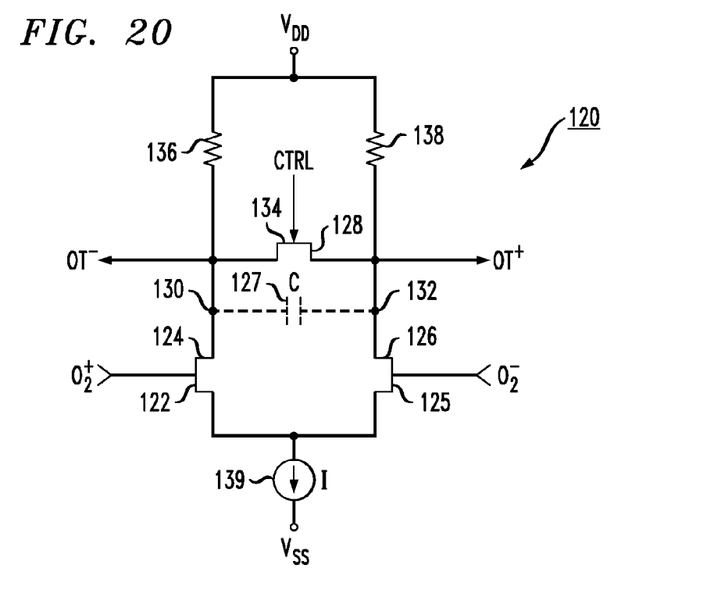
FIG. 20 illustrates another configuration of an active time-dependent filter that provides gain as well as filtering.
Figure 21:
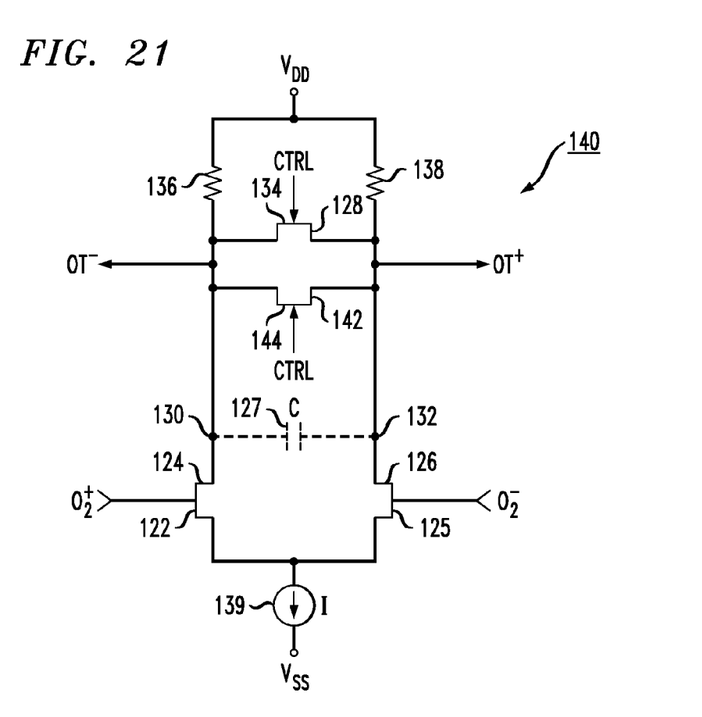
FIG. 21 illustrates a slight variation of the arrangement of FIG. 20, where the time-varying filter arrangement of FIG. 21 includes a second bridging FET disposed in parallel with the bridging FET as shown in FIG. 20.
Figure 22:
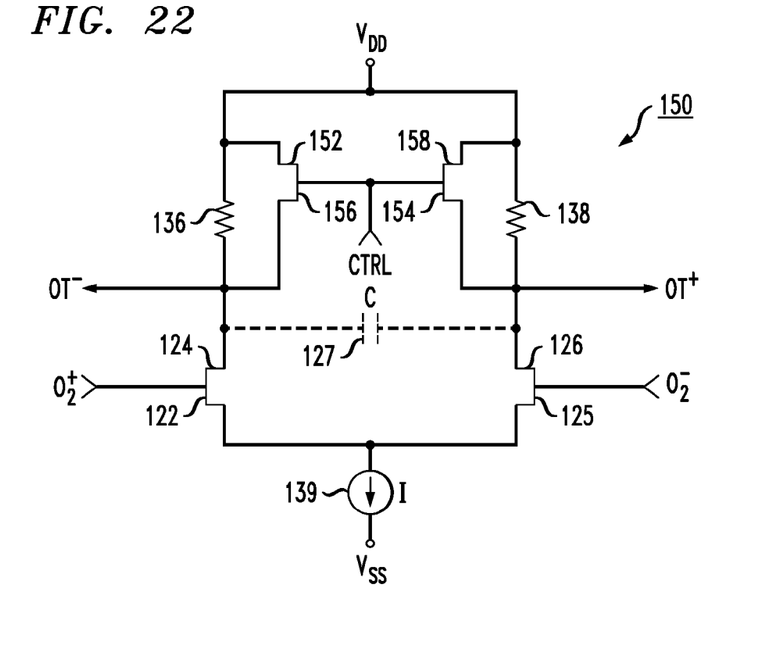
FIG. 22 is an alternative configuration of the same principles as shown in FIGS. 20 and 21, in this case with control FETs disposed in parallel with each rail of the filtering arrangement.

FIGS. 20-22 illustrate other exemplary embodiments of time-variable filters that may be used with differential input signals to create filtered differential output signals that can be used within an associated latched decision filter to generate a digital output with a relatively low BER.

In particular, FIG. 20 illustrates an active time-dependent filter 120 that provides gain as well as filtering. In this arrangement, first differential input signal $O_2^+$ is applied as an input to a gate terminal 122 of a first FET 124 and second differential input signal $O_2^-$ is applied as an input to a gate terminal 125 of a second FET 126. As with the arrangement described above, a stray capacitance C exists between FETs 124 and 126 (where this value may be supplemented by an actual capacitive device 127). A bridging FET 128 is disposed as shown between drain terminal 130 of first FET 124 and drain terminal 132 of second FET 126. In accordance with the present invention, the time-varying CTRL signal created by modifying element 14 is used as a gate control signal, applied to gate terminal 134 of bridging FET 128.

A pair of resistors 136, 138 is shown as disposed between reference voltage source $V_{DD}$ and drain terminals 130, 132, respectively. The presence of bridging FET 128, and the time-varying resistance value it creates between the two rails of this arrangement results again in allowing for filtered differential output signals $OT^+$ and $OT^-$ to better respond to time-varying changes in signal across a baud interval and form an output signal with a lower BER than available in the prior art. A current source 139 is included in this arrangement and connected between voltage supply $V_{ss}$ and the source terminals of FETs 124 and 126, as shown.

FIG. 21 illustrates a slight variation of the arrangement of FIG. 20, where time-varying filter arrangement 140 of FIG. 21 includes a second bridging FET 142 disposed in parallel with bridging FET 128. In this arrangement, second bridging FET 142 is also controlled at its gate terminal 144 by time-varying signal CTRL. In implementation, second bridging FET 142 is disposed in an opposite orientation with respect to the original bridging FET 128; that is, the source terminal of FET 128 and drain terminal of second FET 142 are both coupled to resistor 138 and, similarly, the drain terminal of FET 128 and source terminal of second FET 142 are both coupled to resistor 136.

Another variation of this embodiment is shown in FIG. 22, where in this configuration 150 a bridging FET is replaced by a pair of FETs 152 and 154.

As shown, FET 152 is disposed in parallel with resistor 136 and FET 154 is disposed in parallel with resistor 138. The gate terminals 156, 158 of FETs 152, 154 are coupled together and controlled, as in the other arrangements, by time-varying signal CTRL from modifying element 14 (of FIG. 9). Thus, the time-varying signal applied to the common gate terminals 156,158 will modify the resistance experienced by differential (noisy) input signals $O_2^+$ and $O_2^-$, creating filtered differential output signals $OT^+$ and $OT^-$ which are thereafter used as inputs to latched decision circuit 4 (not shown).

Figure 23:
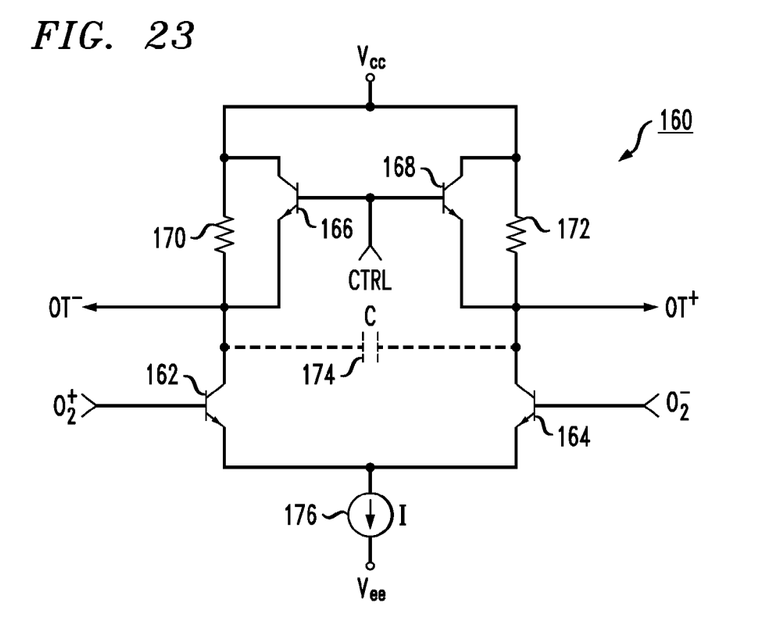
FIG. 23 is a bipolar implementation of the arrangement shown in FIG. 22, in this case with the input signals applied as inputs to a pair of bipolar transistors.

FIG. 23 is a bipolar implementation of the arrangement shown in FIG. 22, in this case with the pair of (noisy) input signals $O_2^+$ and $O_2^-$ applied as inputs to a pair of bipolar transistors 162 and 164. A pair of common-based bipolar transistors 166, 168 is configured as shown, and controlled by time-varying signal CTRL. Bipolar transistor 166 is shown as disposed to surround a first resistor 170 and bipolar transistor 168 is shown as disposed to surround a second resistor 172. A capacitor 174 is disposed between the collector terminals of transistors 162 and 164, with a current source 176 coupled between the connected emitter terminals of transistors 162, 164 and the $V_{cc}$ terminal.

In each of these embodiments, higher frequencies of the (noisy) input signals will experience discrimination (i.e., low pass filtering) by virtue of the presence of the stray capacitance in the filtering arrangement. Depending upon the value of the time-varying input signal CTRL, the effective resistance of the arrangement will vary between relatively low and high values, the variation occurring in sync with the unit baud interval.

As will be apparent to those skilled in the art, numerous modifications may be made within the scope of the invention, which is not intended to be limited except in accordance with the following claims.

What is claimed is:

1. An adaptive filtering arrangement for providing bit-synchronous, time-dependent filtering of a time-varying analog information signal applied as an input thereto, the arrangement comprising
   a time-dependent low pass filter having as an input the time-varying analog information signal including both data and noise components, the time-dependent low pass filtering arrangement including at least one adaptive resistive element that exhibits a varying resistance value as a function of time so as to provide a varying filter bandwidth as a function of time; and
   a modifying element responsive to a recovered clock signal for creating a time-varying control signal that is applied as an input to the adaptive resistive element, wherein the time-varying control signal is synchronous with a baud interval of a created output signal such that an instantaneous bandwidth of the time-dependent low pass filter is synchronous with the baud interval and exhibits a relatively small bandwidth during a central portion of the baud interval and exhibits a relatively large bandwidth during a transition from one baud interval to the next.

2. The arrangement as defined in claim 1 wherein the adaptive resistance element comprises a Field Effect Transistor (FET)-based arrangement.

3. The arrangement as defined in claim 2 wherein the FET-based arrangement comprises a single FET, with the time-varying control signal applied as an input to a gate terminal of the FET.

4. The arrangement as defined in claim 1 wherein the adaptive resistance element comprises a switchable resistor-based arrangement.

5. The arrangement as defined in claim 4 where the switchable resistor-based arrangement comprises a series connection of resistors and a control switch coupled in parallel with at least one resistor, the operation of the switch controlled by the time-varying control signal.

6. The arrangement as defined in claim 4 wherein the switchable resistor-based arrangement comprises a parallel connection of resistors and at least one control switch coupled in series with at least one resistor, the operation of the switch controlled by the time-varying control signal.

7. The arrangement as defined in claim 1 wherein the time-varying analog information signal is presented in differential form as a pair of analog information signals and the time-dependent low pass filter comprises
   a pair of active transistor elements, each for receiving a different input signal of the pair of analog information signals, the pair of active transistor elements coupled together at their control terminals to receive the time-varying control signal from the modifying element.

8. The arrangement as defined in claim 7 wherein the active transistor elements comprise FETs, with their gate terminals coupled together to receive the time-varying control signal.

9. The arrangement as defined in claim 7 wherein the active transistor elements comprise bipolar transistors, with their base terminals coupled together to receive the time-varying control signal.

10. The arrangement as defined in claim 7 wherein the time-dependent filter further comprises a gain stage for amplifying the pair of analog information signals.

11. The arrangement as defined in claim 1 wherein the modifying element comprises a low pass filter, creating a time-varying control signal output that is synchronous with the recovered clock signal applied as an input thereto.

12. The arrangement as defined in claim 1 wherein the modifying element comprises a resonance circuit for creating a time-varying control signal output that is synchronous with the recovered clock signal applied as an input thereto.

13. The arrangement as defined in claim 1 wherein the modifying element comprises a nonlinear circuit for creating a time-varying control signal output that is synchronous with the recovered clock signal applied as an input thereto.

14. A receiver for recovering a digital data stream from an input analog information signal, the receiver comprising
    a splitter for accepting the input analog information signal and dividing the accepted signal into a pair of analog output signals;
    a clock recovery unit responsive to a first analog output signal from the pair of analog output signals for generating a recovered clock signal therefrom, the recovered clock signal defining the bit rate for the recovered digital data stream, with a unit baud interval defining the time length of a given bit;
    a latched decision circuit for determining a symbol value of the accepted input signal by comparing the value of the input signal to a predetermined threshold value at a unit baud interval transition, using the recovered clock signal to define the timing of the unit baud interval transition; and
    an adaptive filtering arrangement responsive to a second analog output signal from the pair of analog output signals for providing bit-synchronous, time-dependent filtering of the second analog output signal and comprising
       a time-dependent low pass filter responsive to the second analog output signal and including at least one adaptive resistive element that exhibits a varying resistance value as a function of a time; and
       a modifying element responsive to the recovered clock signal for creating a time-varying control signal applied as an input to the adaptive resistive element, wherein the time-varying control signal is synchronous with the baud interval such that the instantaneous bandwidth of the time-dependent low pass filter is synchronous with the baud interval and exhibits a relatively small bandwidth during a central portion of the baud interval and exhibits a relatively large bandwidth during a transition from one baud interval to the next.

15. A receiver as defined in claim 14 wherein the adaptive resistance element of the adaptive filtering arrangement comprises a Field Effect Transistor (FET)-based arrangement.

16. A receiver as defined in claim 15 wherein the FET-based arrangement comprises a single FET, with the time-varying control signal applied as an input to a gate terminal of the FET.

17. A receiver as defined in claim 14 wherein the adaptive resistance element of the adaptive filtering arrangement comprises a switchable resistor-based arrangement.

18. A receiver as defined in claim 14 wherein the input analog information signal comprises a differential signal comprising a pair of input signals and the time-dependent low pass filter of the adaptive filtering arrangement comprises
    a pair of active transistor elements, each for receiving a different input signal of the pair of input signals, the pair of active transistor elements coupled together at their control terminals to receive the time-varying control signal from the modifying element.

19. A receiver as defined in claim 14 wherein the modifying element of the adaptive filtering arrangement comprises a low pass filter, creating a time-varying control signal output that is synchronous with the input recovered clock signal.

20. A receiver as defined in claim 14 wherein the receiver further comprises a delay element disposed in the signal path between the clock recovery unit and the input to the latched decision circuit to compensate for a delay associated with the adaptive filtering arrangement.

* * * * *